United States Patent
Reed

[15] 3,672,416
[45] June 27, 1972

[54] DRIVE ASSEMBLY FOR DUAL CHUCK VENEER LATHES

[72] Inventor: Gaylard O. Reed, 8636 S.W. 14th Ave., Portland, Oreg. 97219

[22] Filed: April 3, 1970

[21] Appl. No.: 25,387

[52] U.S. Cl. .........................................................144/209 R
[51] Int. Cl. ................................................................B27l 5/02
[58] Field of Search .......................................144/209, 208 G

[56] References Cited

UNITED STATES PATENTS 2,869,596   1/1959   Latimer..................................144/209

FOREIGN PATENTS OR APPLICATIONS 1,169,643   5/1964   Germany................................144/209

*Primary Examiner*—Donald R. Schran
*Attorney*—Oliver D. Olson

[57] ABSTRACT

A veneer lathe frame supports a pair of axially aligned log-supporting chuck assemblies each including a pair of rotary chuck-supporting spindles arranged concentrically for independent longitudinal reciprocation. The inner spindle is connected to a rotary drive source and is coupled to the outer spindle for rotating the latter. The inner spindle is connected through a thrust bearing to an axially aligned hydraulic drive cylinder unit and the outer spindle is connected through a thrust bearing and floating drive link to a laterally positioned hydraulic drive cylinder unit.

5 Claims, 1 Drawing Figure

PATENTED JUN 27 1972 3,672,416
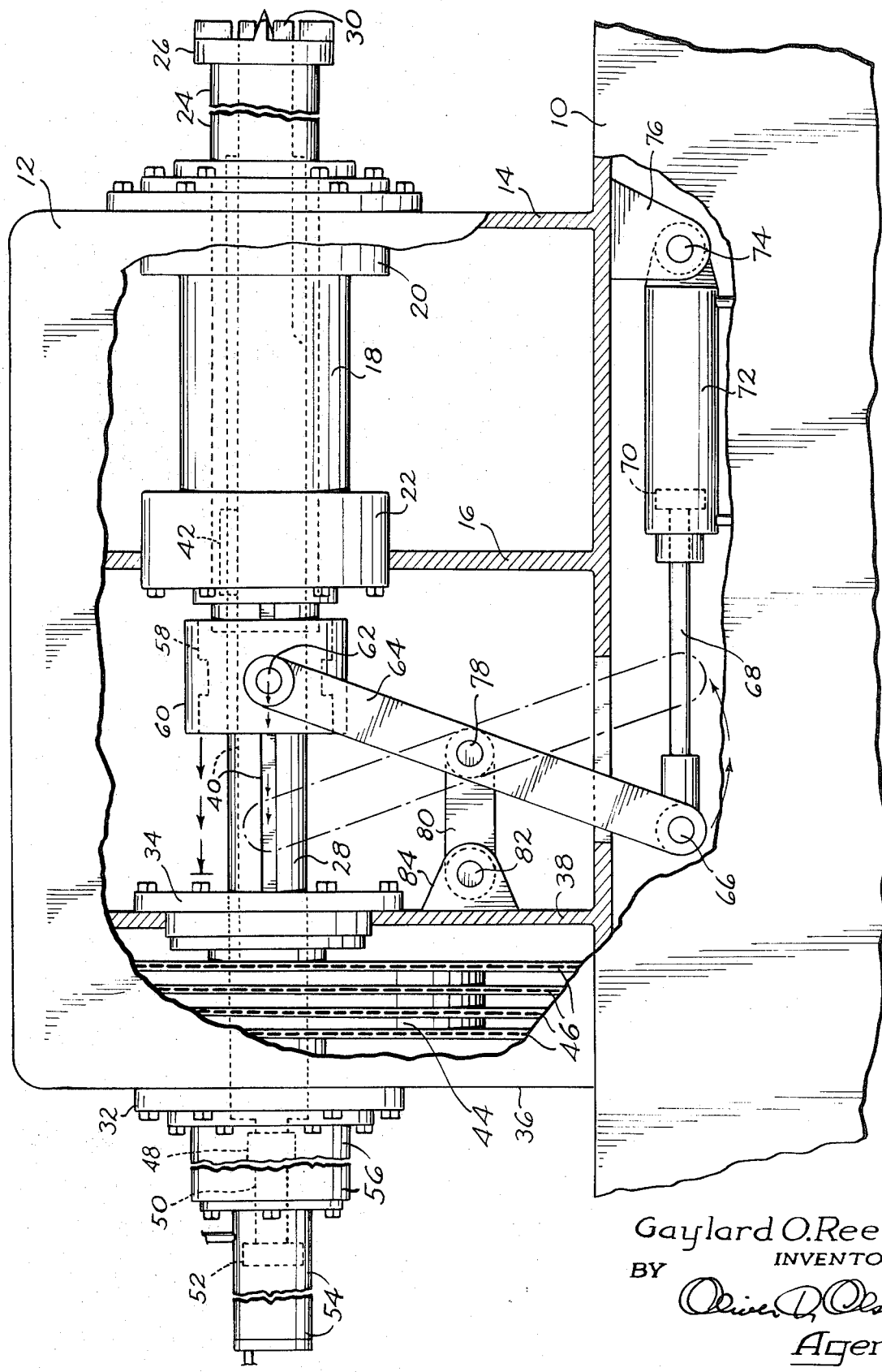
Gaylard O. Reed
INVENTOR
BY Oliver D. Olson
Agent

DRIVE ASSEMBLY FOR DUAL CHUCK VENEER LATHES

BACKGROUND OF THE INVENTION

This invention relates to veneer lathes, and more particularly to a simplified and highly efficient drive assembly for dual chuck veneer lathes.

Dual chuck and drive assemblies for veneer lathes have been provided heretofore in order to effect reduction of a log to minimum core diameter, whereby to achieve maximum utilization of the log and minimum waste. However, such assemblies of the prior art are characterized disadvantageously by structures which are relatively costly to manufacture and maintain, by excessive length which utilize excessive plant space and by the utilization of excessive power to reciprocate the outer chuck resulting from the driving of the inner spindle rotationally by the outer spindle.

SUMMARY OF THE INVENTION

In its basic concept the dual chuck veneer lathe drive assembly of this invention provides for driving the outer spindle rotationally by the inner spindle and provides for longitudinal reciprocation of the outer spindle by coupling the latter to a hydraulic drive cylinder unit through a thrust bearing and floating drive link.

It is by virtue of the foregoing basic concept that the principal objective of this invention is achieved; namely, to overcome the aforementioned disadvantages of prior dual chuck drive assemblies.

The foregoing and other objects and advantages of this invention will appear from the following detailed description, taken in connection with the accompanying drawing of the preferred embodiment.

BRIEF DESCRIPTION OF THE DRAWING

The single FIGURE is a foreshortened, fragmentary view in side elevation of a dual chuck and drive assembly embodying the features of this invention, parts being broken away or shown in broken lines to disclose details of internal construction.

DESCRIPTION OF THE PREFERRED EMBODIMENT

As is well known, a veneer lathe includes a pair of laterally spaced axially aligned chuck assemblies which function to support between them a log to be peeled. Since the chuck assemblies of each pair are substantially identical, only one of them is illustrated in the drawing.

A transversely elongated main frame 10, preferably of hollow construction, supports above it a pair of laterally spaced chuck assembly housings 12, one of which is shown in the drawing. The housings are considered to be an integral part of the frame. Between the front wall 14 and adjacent intermediate wall 16 of the housing is supported a hollow bearing housing 18 the opposite end portions 20, 22 of which support longitudinally spaced bearings. These bearings journal an outer spindle 24 for axial rotation and longitudinal adjustment. The forward end of the outer spindle mounts an outer chuck 26, in well known manner.

The outer spindle and chuck are hollow, providing an axial bore for reception of an inner spindle 28. The forward end of the inner spindle mounts an inner chuck 30, in conventional manner. The rearward portion of the inner spindle extends rearward of the outer spindle and is supported by bearings 32 and 34 mounted on the rear wall 36 and adjacent intermediate wall 38 of the housing.

Means is provided for coupling the inner and outer spindles together for simultaneous rotation and for independent longitudinal reciprocation. In the embodiment illustrated, the inner spindle is provided with at least one, and preferably a plurality of circumferentially spaced longitudinal keyways 40 each of which slidably receives a key 42 secured to the outer spindle. Thus, the inner and outer spindles are coupled together for simultaneous rotation and yet are movable longitudinally independently of each other.

The inner spindle extends rearward of the outer spindle and mounts a drive sprocket 44 for rotation therewith. The drive sprocket is coupled through a chain assembly 46 to the output shaft of a drive motor (not shown) housed in the main frame 10.

Thus, it will be apparent that the inner spindle 28 is driven rotationally by direct coupling to a drive motor and that the outer spindle 24 is driven by the inner spindle, by the interconnecting keys and keyways. Accordingly, when the pair of outer spindles and outer chucks are retracted, for further reduction of a peeler log supported between the laterally spaced pair of inner chucks, no driving torque is applied to the outer spindle. This minimizes friction between the inner and outer spindles and correspondingly minimizes the force required to retract the outer spindle.

The rearward end of the inner spindle 28 is connected through a thrust bearing 48 to the piston rod 50 of a piston 52 reciprocative in hydraulic cylinder 54. The piston and cylinder assembly thus forms an hydraulic piston-cylinder drive unit for reciprocating the inner spindle. The cylinder is mounted on the rearward end of a hollow tube 56 which, in turn, is secured to the rear wall 36 of the housing 12. The hollow tube surrounds the movable piston rod and thrust bearing and thus protects the latter from jamming and damage by debris.

By application of hydraulic pressure selectively to the opposite ends of the cylinder 54 the piston 52 is caused to reciprocate therein and thus reciprocate the inner spindle and inner chuck 30 between extended and retracted positions. The thrust bearing coupling between the piston rod and inner spindle allows the latter to rotate without rotating the piston and piston rod, thereby minimizing wear of the piston-cylinder unit.

Means is provided for reciprocating the outer spindle 24 longitudinally relative to the inner spindle to extend and retract the outer chuck, 26. In the embodiment illustrated the rearward end of the outer spindle is connected to the inner component 58 of a thrust bearing. The outer component 60 of the thrust bearing, which is rotatable relative to the inner component, mounts a pair of shafts 62 which project outward therefrom in diametrically opposite directions. A pair of elongated drive links 64 are mounted pivotally at one end one on each of the shafts. The opposite ends of the links are connected pivotally to a cross shaft 66 carried by the projecting end of a piston rod 68. The inner end of the piston rod is attached to a piston 70 which is reciprocative in an hydraulic cylinder 72. The end of the cylinder opposite the piston rod is supported pivotally by the shaft 74 carried by the mounting bracket 76 secured to the main frame 10.

The links 64 are connected intermediate their ends pivotally to a cross shaft 78 mounted on one end of a fulcrum link 80. The opposite end of the fulcrum link is supported pivotally by a shaft 82 mounted on brackets 84 secured to the intermediate wall 38 of the housing. The fulcrum link thus permits the fulcrum shaft 78 to move arcuately about the support shaft 82 as a radius. This movement of the fulcrum shaft permits the drive links 64 to float vertically and thus allows the thrust bearing 58, 60 and connected outer spindle 28 to reciprocate rectilinearly, along the common axis of the spindles, between the extended position of the drive links shown in full lines and the retracted position of the drive links shown in broken lines. Such movement is effected by appropriate operation of the hydraulic piston-cylinder drive unit formed by the piston 70 and cylinder 72. During rectilinear movement of the thrust bearing and its supported shafts 62 along the axis of the concentric spindles, the cross shaft 66 supporting the bottom ends of the drive links reciprocate arcuately along the path indicated by the arrows. This arcuate movement is accommodated by pivoting of the piston-cylinder unit about its supporting pivot shaft 74.

It will be apparent that the thrust bearing 58, 60 functions to allow the outer spindle to rotate while coupling it to the floating drive link assembly for longitudinal reciprocation.

The fulcrum shaft 78 is connected to the drive links 64 midway between the shafts 62 and 66. This provides a one-to-one ratio between the distances of travel of the latter shafts. If desired, the fulcrum shaft may be connected to the drive links at other intermediate points between the shafts to provide any other desired travel ratio.

Since no driving torque is applied to the outer spindle, the power requirement for the hydraulic piston-cylinder drive unit 70, 72 and the wear of keyways 40 and keys 42 are minimized. Further, by locating the floating drive link and drive unit laterally of the spindles the over-all length of the assembly, and hence the plant floor space, is minimized.

The floating drive link assembly illustrated for moving the outer spindle longitudinally also may replace the piston-cylinder unit illustrated for moving the inner spindle 28 longitudinally. In such instance, the floating drive link assembly may be connected to the inner spindle rearward of the drive sprocket 44, as at the position of the thrust bearing 48.

It will be apparent to those skilled in the art that the foregoing and various other changes in the size, shape, number and arrangement of parts described hereinbefore may be made without departing from the spirit of this invention.

Having now described my invention and the manner in which it may be used, I claim:

1. In a veneer lathe, the combination of:
   a. a frame;
   b. an elongated hollow cylindrical outer spindle member mounted on the frame for longitudinal and rotary movement and supporting a chuck at its forward end;
   c. an elongated longitudinally movable rotary inner spindle member supporting a chuck at its forward end and extending through and rearwardly of the outer spindle member;
   d. rotary drive means engaging the inner spindle member rearward of the outer spindle member for rotating said inner spindle member, and
   e. connector means interengaging the inner and outer spindle members slidably for relative longitudinal movement and for simultaneous rotation of the outer spindle member by the inner spindle member.

2. The combination of claim 1 including
   a. longitudinally rigid drive link means,
   b. fulcrum pivot means mounted on the frame engaging the drive link means for pivotal movement of the latter,
   c. drive means on the frame engaging the drive link means for pivoting the latter, and
   d. thrust bearing means interengaging one of the spindle members and drive link means for moving said spindle member longitudinally by pivotal movement of the drive link means.

3. The combination of claim 2 wherein the thrust bearing means interengages the outer spindle member and drive link means and encircles the inner spindle member, and second drive means engages the inner spindle member for moving the latter longitudinally.

4. The combination of claim 2 wherein the fulcrum pivot means comprises a fulcrum pivot support member mounted pivotally at one end on the frame and connected pivotally at the opposite end to the drive link means.

5. The combination of claim 4 wherein the drive means for the drive link means comprises an extensible hydraulic piston-cylinder unit mounted pivotally at one end on the frame and connected pivotally at the opposite end to the drive link means.

* * * * *